July 14, 1936.                    D. S. JACOBUS                    2,047,633
                 PRESSURE VESSEL AND METHOD OF MAKING THE SAME
                           Filed Aug. 25, 1933
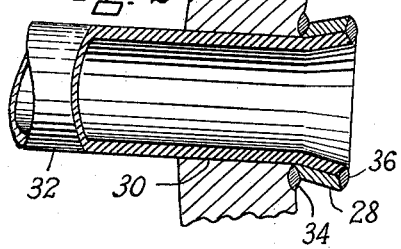
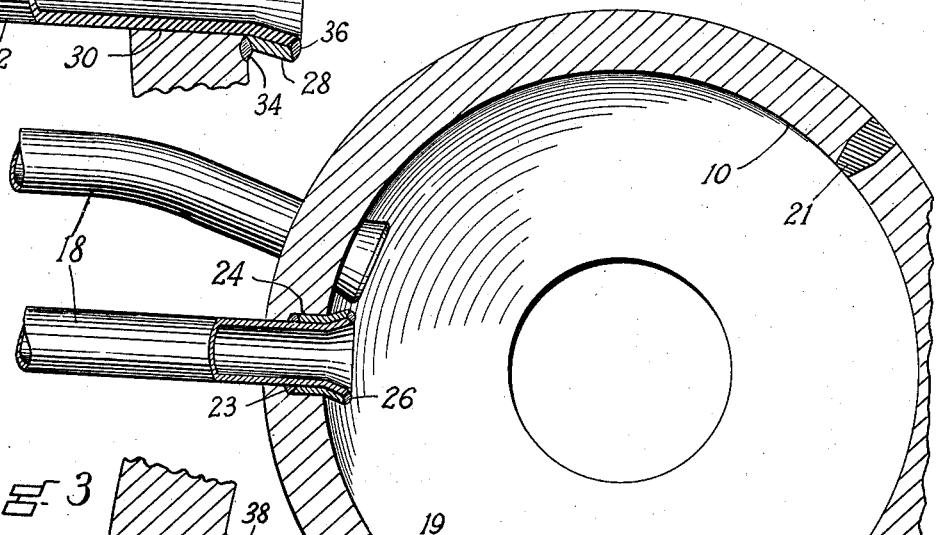
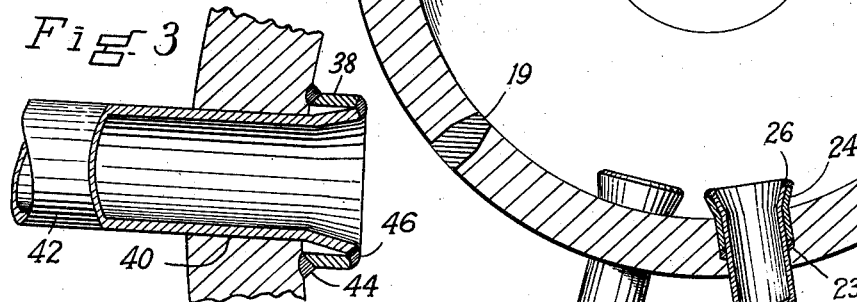
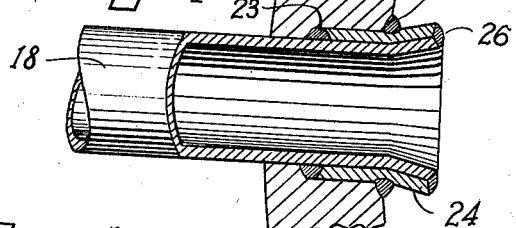
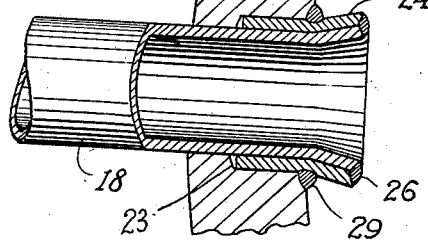
INVENTOR
David S. Jacobus
BY Benj. R. Newcomb
ATTORNEY Patented July 14, 1936

2,047,633

UNITED STATES PATENT OFFICE 2,047,633

PRESSURE VESSEL AND METHOD OF MAKING THE SAME

David S. Jacobus, Montclair, N. J., assignor to The Babcock & Wilcox Company, Newark, N. J., a corporation of New Jersey Application August 25, 1933, Serial No. 686,699

20 Claims. (Cl. 29—157.4)

This invention relates to improvements in fluid heat exchange devices, and is more particularly concerned with such apparatus utilizing large pressure chambers to which tubular members are connected and the method of making the same.

In the development of steam boilers, pressures have become higher and higher. Better efficiencies have been obtained at the higher pressures, and, at the present time, many large steam power plants are successfully operating at pressures several times those employed a comparatively few years ago. Consequently, boilers have had to be made stronger to withstand the greater pressures. Many boiler drums, for instance, have wall thicknesses of from 2 to 4 inches. It has not been feasible to construct all of such drums by riveting, and recourse has been had to expensive methods of construction involving the welding of sections to form the drums, or forging the drum from a single billet.

In the manufacture of pressure drums by welding or forging it has been found that undesirable stresses are developed and in order to relieve the drums of such stresses it has been the practice to heat treat such drums to stress relieve them, or to anneal them. In the case of heavy forged drums the heat treatment usually consists in heating the entire drum simultaneously above the critical temperature, thereby annealing the material in the drum.

In the present practice of fusion welding drums where the carbon content in the steel does not exceed .35 per cent the drums after welding are stress relieved by heating them to a temperature in the neighborhood of 1200° F., which is lower than the critical temperature. In certain cases, the material from which a fusion welded drum is made requires that it be annealed above the critical temperature after the fusion welding in the same way as is the practice for heavy forged drums.

In boiler and pressure vessel construction it is often necessary to fusion weld tube ends to the shell to add to the strength, and to prevent leakage. The applicant has discovered a mode of manufacture which enables such welding to be done without in any way nullifying the results of the heat treatment of the drum. Furthermore, his discovery results in a drum and tube combination which is superior to prior art combinations of such parts from the standpoint of maintenance costs caused by the loosening of the tubes at their seats and the replacement of burned out tubes in the case of steam boilers.

Other objects of the invention will appear as the accompanying description proceeds.

The invention will be described with reference to the accompanying drawing in which:

Fig. 1 is a view in the nature of a vertical section through a drum constituting a part of a water tube steam boiler.

Fig. 2 is a detail sectional view illustrating a second embodiment of the invention.

Fig. 3 is a sectional view illustrating a third embodiment of the invention.

Fig. 4 is a detail view illustrating a ferrule which is welded to a drum at two positions.

Fig. 5 is a detail sectional view showing an additional manner of forming a drum and tube connection.

In the drawing the pressure vessel is illustrated as the steam and water drum 10 of a water tube steam boiler. Connected to the water space of the drum by downtake nipples 12 is a downtake header 14. This header is in communication with a bank of steam generating tubes one of which is indicated at 16. Appropriate header and nipple connections (not shown) lead the steam and water from the generating tubes to horizontal circulators 18 discharging into the steam space of the drum.

When the drum is formed by welding there are weld metal joints such as those shown at 19 and 21. The metal heating which is involved in this operation sets up undesirable stresses, or, in the case of steels having a high carbon content, may cause undesirable changes in the grain structure.

The tube seat holes may be formed in the drum before the curved sections are welded to form the drum, or they may be formed after the joints 19 and 21 are completed. In the tube and drum connections shown in Figs. 1, 4, and 5 of the drawing, the tube seats are formed with two bores of different diameters. The bore extending from the inner surface of the drum is the larger, and at its junction with the smaller bore, it forms the shoulder 23. The larger bores receive ferrules 24 which tightly fit the walls of the tube seat with their inner ends spaced from the shoulder 23 to provide a groove for the reception of weld metal. This weld metal is preferably deposited by fusion before the drum is heat treated.

The ferrules 24 are short tubular sections extending inwardly of the drum beyond its inner surface as clearly shown by the drawing. After these ferrules are welded to the drum, the drum with the attached ferrules is heat treated.

After heat treating the drum with its attached ferrules, the tubular connectors are inserted through the ferrules and the seat forming passageways in the drum and are preferably positioned so that their inner ends are in substantial alignment with the inner ends of the ferrules. The inner ends of the connectors may be belled as shown. The belling operation increases the security with which the joints between the tubular connectors and the drum resist the tendency of the pressure to force the connectors out of their seats in the drum.

After the ferrules and the inner ends of the connectors are belled to the form indicated their inner ends are united by a welding operation which causes the deposition of the ring of metal 26. The ferrules are made long enough so that any heat conducted to the drum through welding the ends of the connectors to the inner ends of the ferrules does not heat the drum sufficiently to induce objectionable stresses in the drum or to change the grain structure.

In the embodiment of the invention indicated in Fig. 4 of the drawing there is shown a weld 27 which may be made after the ferrule is welded at its inner end to the drum. In this case the ferrule may be belled outwardly before the weld 27 is made.

In making the tube and drum connections in accordance with the disclosure of Fig. 5, the ferrule 24 does not have its inner end welded to the drum. It may be expanded after it is placed in position and then belled prior to the deposition of the weld metal 29. It will be understood that in all three of the embodiments of the invention indicated in Figs. 1, 4, and 5, the ferrule is secured to the inner end of the tube by the weld 26 which extends across the aligned inner ends of the ferrules and the tubes.

In Fig. 2 the ferrule 28 does not extend into an opening in the drum, but is welded to the inner drum wall around the tube seat 30. This operation, of course, is carried on before the insertion of the tube 32 in the tube seat and causes the deposit of the ring of weld metal indicated at 34. The next step is similar to the corresponding step described above, and after the tube 32 is moved through the tube seat, its inner end and the ferrule itself are belled and brought to the formation clearly indicated in the drawing. The last step in the operation is, of course, the welding which results in the ring deposit of weld metal 36.

In the Fig. 3 embodiment of the invention, the ferrule is in the form of the section 38 of a hollow right cylinder, having its outer end welded to the metal along the inner wall of the drum at a position substantially removed from the wall of the tube seat 40. The steps involved in forming the tubular connection indicated in Fig. 3 are substantially the same as those involved in the formation of the other tubular connection except that the ferrule 38 is not subjected to the belling action when the inner end of the tube 42 is belled. In this embodiment of the invention there are deposits of weld metal 44 and 46 corresponding to the similar deposits described in connection with the formation of the other tubular connections.

While this invention has been described with reference to certain particular embodiments, it is to be appreciated that it is not limited thereto, but is of a scope commensurate with the scope of the subjoined claims.

What is claimed is—

1. In combination, a welded and stress relieved metallic pressure vessel having the characteristics of a drum with its walls formed with a tubular seat, a metallic ferrule of tubular form welded at one end to the metal of the drum adjacent the seat and having its inner end free of the inner surface of the vessel, and a tubular connector extending through the seat and having its inner end welded to the free end of the ferrule.

2. In fluid heat exchange apparatus, a pressure vessel having the characteristics of a drum with thick walls of steel of a high carbon content and fabricated in a manner conducive to the production of locked-in stresses, a tubular metallic ferrule extending into a tube seat formed as a passage through the wall of the vessel and having one end welded to the metal of the wall adjacent the seat and having its inner end free of the inner surface of the vessel, and a tubular connector extending through the seat in tight contact therewith and having its inner end welded to the ferrule.

3. A welded steel pressure vessel having the characteristics of a drum requiring stress relieving heat treatment during its manufacture and having a wall formed with a passage therethrough to constitute a seat for a tubular connection, a tubular ferrule extending inwardly of the vessel and having one end welded to the metal of the vessel wall adjacent the seat and having its inner end free of the inner surface of the vessel, and a tubular connector extending through the seat in tight contact therewith and having its inner end aligned with the end of the ferrule and welded thereto.

4. A welded steel pressure vessel having the characteristics of a drum fabricated in such a way that locked-in stresses are produced and having a wall formed with a passage therethrough to constitute a seat for a tubular connection, a tubular ferrule extending inwardly of the vessel from a position intermediate the ends of the seat and having one end welded to the metal of the seat wall and a tubular connector extending through the seat into the ferrule, and welded thereto.

5. In the manufacture of a steam boiler, the method including welding preformed drum sections to form a boiler drum, forming seats in the drum, welding the ends of ferrules to the walls of the tube seats with the ferrules extending toward the drum center from their welded ends and having their inner ends located inwardly and free of the inner surface of the drum, relieving the drum of local stresses caused by the welding, inserting tubular members through the seats and the ferrules and welding the ferrules to said members.

6. In the manufacture of a steam boiler, the method including welding preformed drum sections to form a boiler drum, forming seats in the drum, welding the ends of ferrules to the walls of the tube seats with the ferrules extending toward the drum center from their welded ends and having their inner ends located inwardly and free of the inner surface of the drum, relieving the drum of local stresses produced by the welding, inserting tubular members through the ferrules so that their inner ends are adjacent the inner ends of the ferrules, and welding the inner ends of the ferrules and said members from positions within the drum.

7. In combination, a heat fabricated and stress relieved metallic pressure vessel having the characteristics of a drum with a wall formed with a tubular seat, a metallic ferrule of tubular form welded at one end to the metal of the drum adjacent the seat and having its opposite end free of the drum metal, and a tubular connector having its inner end welded to the free end of the ferrule.

8. In fluid heat exchange apparatus, a welded pressure vessel having the characteristics of a drum with thick walls of steel of a high carbon content and requiring stress relieving heat treatment during its manufacture, a tubular metallic ferrule extending to a tube seat formed as a passage through the wall of the vessel and having one end welded to the metal of the wall adjacent the seat, and a tubular connector having its inner end welded to the ferrule.

9. In the manufacture of fluid pressure drums, the method including joining preformed curved plate sections by fusion welding to form a drum, forming seats in the drum, welding the ends of ferrules to the walls of the tube seats with the ferrules extending toward the drum center from their welded ends and having their inner ends free of the inner surface of the drum, heat treating the drums and ferrules to eliminate local stresses caused by the welding, inserting tubular members through the seats and the ferrules and welding the ferrules to said members at positions substantially removed from the positions of the first mentioned weldings.

10. In the manufacture of pressure drums, the method including fusion welding preformed drum sections to form a drum, forming tube seats in the drum, welding the ends of ferrules to the walls of the tube seats with the ferrules extending toward the drum center from their welded ends and having their inner ends free of the inner surface of the drum, subsequently heat treating the drum to relieve it of local stresses produced by the welding, inserting tubular members through the ferrules so that their inner ends are adjacent the inner ends of the ferrules, expanding the tubular members against the walls of the tube seats, and welding the opposite ends of the ferrules and said members from positions within the drum.

11. In combination, a welded metallic pressure vessel having the characteristics of a drum requiring stress relieving heat treatment before operativeness and having its walls formed with multiple diametered tube seats which have large and small bore portions with a shoulder between them, metallic ferrules of tubular form seated within the larger bores with each ferrule welded at one end to the metal of the drum adjacent the shoulders, the ferrules having their opposite ends free of the drum metal, and tubular connectors extending through the seats and having their inner ends welded to the free ends of the ferrules.

12. In fluid heat exchange apparatus, a welded pressure vessel having the characteristics of a drum with thick walls of steel of a high carbon content and requiring stress relieving heat treatment before use, a tubular metallic ferrule extending into a multiple bore tube seat formed as a passage through the wall of the vessel and having one end welded to the metal of the wall adjacent a shoulder between the two bores of the seat and having its opposite end free of the drum metal, and a tubular connector extending through the seat in tight contact therewith and having its inner end welded to the free end of the ferrule.

13. In the manufacture of fluid heat exchange apparatus, the method of including fusion welding metallic ferrules to the shell of a pressure vessel, said ferrules being maintained with their ends spaced from the metal of the shell of the vessel a sufficient distance to allow tubes to be subsequently fusion welded to the projecting ends of the ferrules without heating the shell sufficiently to induce objectionable stresses or to injure the grain structure, stress relieving the vessel by heating it after fusion welding the ferrules to the shell, and fusion welding the tubes to the projecting ends of the ferrules after said stress relieving.

14. In the manufacture of fluid heat exchange apparatus, the method including fusion welding ferrules to the shell of a pressure vessel, said ferrules being maintained with their ends spaced from the metal of the shell of the vessel a sufficient distance to allow tubes to be subsequently fusion welded to the projecting ends of the ferrules without heating the shell sufficiently to induce objectionable stresses or to injure the grain structure, stress relieving the vessel by heating it to a temperature of the order of 1200° F. after fusion welding the ferrules to the shell, and fusion welding the tubes to the projecting ends of the ferrules after said stress relieving.

15. In the manufacture of fluid heat exchange apparatus, the method including fusion welding ferrules to the shell of a pressure vessel, said ferrules being maintained with their ends spaced from the metal of the shell of the vessel a sufficient distance to allow tubes to be subsequently fusion welded to the projecting ends of the ferrules without heating the shell sufficiently to induce objectionable stresses or to injure the grain structure, annealing the vessel by heating it above the critical temperature after fusion welding the ferrules to the shell, and fusion welding the tubes to the projecting ends of the ferrules after said stress relieving.

16. In combination, a metallic pressure vessel having the characteristics of a welded steel drum which requires heat treatment before use, ferrules welded thereto before the vessel and the attached ferrules are stress relieved, said ferrules having their ends spaced from the metal of the shell of the vessel a sufficient distance to allow tubes to be subsequently attached to the projecting ends of the ferrules by fusion welding without heating the shell sufficiently to induce objectionable stresses or to injure the grain structure, and tubes having their ends welded to the projecting ends of the ferrules.

17. In combination, metallic ferrules, a metallic pressure vessel to which the ferrules have corresponding ends shop welded before the resulting product is subjected to stress relieving heat treatment, the ferrules having ends which are free of the surface of the vessel, and tubes which are end welded in situ to the free ends of the ferrules after the vessel is subjected to said stress relieving heat treatment, the ferrules being spaced from the tubes at least throughout the major portions of the lengths of the former.

18. In combination, metallic ferrules, a metallic pressure vessel to which the ferrules have corresponding ends shop welded before the resulting product is subjected to stress relieving heat treatment, the ferrules having ends which are free of the surface of the vessel, and tubes which are end welded in situ to the free ends of the ferrules after the vessel is subjected to said stress relieving heat treatment, the ferrules having a plurality of circumferential weld seams spaced along their lengths and uniting them with the metal of the vessel.

19. In combination, metallic ferrules, a metallic pressure vessel to which the ferrules have corresponding ends shop welded before the resulting product is subjected to stress relieving heat treatment, the ferrules having free ends projecting from the wall of the vessel, and tubes which are end welded in situ to the free ends of the ferrules after the vessel is subjected to said stress relieving heat treatment, the ferrules having spaced internal and external circumferential weld seams uniting them with the metal of the vessel.

20. In pressure apparatus, a metallic pressure vessel having the characteristics of a welded steel pressure drum which requires stress relieving heat treatment before use, a wall of the vessel being formed with a seat in the nature of a tube seat, a tubular metallic ferrule or the like welded at one end to the metal of the drum adjacent the seat, and a tubular connector having its inner end welded to the free end of the ferrule.

DAVID S. JACOBUS.